US 12,015,755 B2

(12) United States Patent
Kim et al.

(10) Patent No.: US 12,015,755 B2
(45) Date of Patent: Jun. 18, 2024

(54) REAL-TIME OMNIDIRECTIONAL STEREO MATCHING METHOD USING MULTI-VIEW FISHEYE LENSES AND SYSTEM THEREOF

(71) Applicant: Korea Advanced Institute of Science and Technology, Daejeon (KR)

(72) Inventors: Min Hyuk Kim, Daejeon (KR); Meuleman Andreas, Daejeon (KR); Hyeonjoong Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 143 days.

(21) Appl. No.: 17/656,049

(22) Filed: Mar. 23, 2022

(65) Prior Publication Data
US 2022/0321859 A1 Oct. 6, 2022

(30) Foreign Application Priority Data

Mar. 25, 2021 (KR) .................. 10-2021-0038583
Feb. 11, 2022 (KR) .................. 10-2022-0018075

(51) Int. Cl.
*H04N 13/128* (2018.01)
*H04N 13/111* (2018.01)
(Continued)

(52) U.S. Cl.
CPC ......... *H04N 13/128* (2018.05); *H04N 13/111* (2018.05); *H04N 13/15* (2018.05);
(Continued)

(58) Field of Classification Search
CPC .... H04N 13/128; H04N 13/15; H04N 13/293; H04N 13/243; H04N 13/111
See application file for complete search history.

(56) References Cited

U.S. PATENT DOCUMENTS

2018/0278916 A1* 9/2018 Kim ...................... G03B 37/04
2019/0349567 A1* 11/2019 Aggarwal ............. G03B 37/04
(Continued)

FOREIGN PATENT DOCUMENTS

KR     10-2012-0126016 A     11/2012
KR     10-2017-0017700 A     2/2017
(Continued)

OTHER PUBLICATIONS

PCT International Search Report with English Translation for International Application No. PCT/KR2022/004253 issued Jan. 18, 2023.
(Continued)

*Primary Examiner* — Rowina J Cattungal
(74) *Attorney, Agent, or Firm* — Hamilton, Brook, Smith & Reynolds, P.C.

(57) ABSTRACT

Provided is a real-time omnidirectional stereo matching method in a camera system including a first pair of fisheye cameras including first and second fisheye cameras provided to perform shooting in opposite directions and a second pair of fisheye cameras including third and fourth fisheye cameras provided to perform shooting in opposite directions and in which the first pair of fisheye cameras and the second pair of fisheye cameras are vertically provided, including receiving fisheye images of a subject captured through the first to the fourth fisheye cameras; selecting one fisheye camera from among fisheye cameras for each pixel of a preset reference fisheye image among the fisheye images using a sweep volume for preset distance candidates; generating a distance map for all pixels using the reference fisheye image and a fisheye image of the one fisheye camera; and performing real-time stereo matching on the fisheye images using the distance map.

19 Claims, 10 Drawing Sheets

(51) Int. Cl.
  *H04N 13/15* (2018.01)
  *H04N 13/243* (2018.01)
  *H04N 13/293* (2018.01)
  *H04N 13/00* (2018.01)
(52) U.S. Cl.
  CPC ......... *H04N 13/243* (2018.05); *H04N 13/293* (2018.05); *H04N 2013/0081* (2013.01)

(56) References Cited

U.S. PATENT DOCUMENTS

| | | | | |
|---|---|---|---|---|
| 2021/0321071 | A1* | 10/2021 | Xiao | H04N 13/111 |
| 2021/0334569 | A1* | 10/2021 | Fang | G06V 40/171 |
| 2022/0060677 | A1* | 2/2022 | Park | H04N 13/232 |
| 2022/0138977 | A1* | 5/2022 | Yan | G06T 3/0093 |
| | | | | 382/154 |

FOREIGN PATENT DOCUMENTS

| | | | |
|---|---|---|---|
| KR | 10-2018-0108106 A | 10/2018 | |
| KR | 10-2018-0131743 A | 12/2018 | |
| KR | 10-2020-0122323 A | 10/2020 | |
| KR | 20200122323 A * | 10/2020 | ........... B64C 39/024 |

OTHER PUBLICATIONS

Meuleman Andreas et al., "Real-Time Sphere Sweeping Stereo from Multiview Fisheye Images", 2021 IEEE/CVF Conference on Computer Vision and Pattern Recognition (CVPR), IEEE, Jun. 20, 2021 (Jun. 20, 2021), pp. 11418-11427.

Pozo Albert Parra App@Fb Com et al., "An integrated 6DoF Video camera and system design", ACM Transactions on Graphics, ACM, NY, US, vol. 37, No. 6, Nov. 8, 2019 (Nov. 8, 2019), pp. 1-16.

Changhee Won et al., "SweepNet: Wide-baseline Omnidirectional Depth Estimation", arxiv.org, Cornell University Library, 201OLIN Library Cornell University Ithaca, NY 14853, Feb. 28, 2019 (Feb. 28, 2019).

Changhee Won et al., "OmniMVS: End-to-End Learning for Omnidirectional Stereo Matching", 2019 IEEE/CVF International Conference on Computer Vision (ICCV), IEEE, Oct. 27, 2019 (Oct. 27, 2019), pp. 8986-8995.

Extended European Search Report, Application No. EP 22164170.7, Dated: Aug. 26, 2022, 10 pages.

* cited by examiner (a) Our prototype  
(b) Input fisheye images  
(c) Our panorama result  
(d) Our distance result

- $(\theta, \phi)$
- $P_{R_{c1} T_{c1}}(\theta, \phi, d_0)$
- $P_{R_{c1} T_{c1}}(\theta, \phi, d_{N-1})$
- Closest sphere
- Furthest sphere
- Intermediate sphere Fisheye camera (a) Best camera evaluation (b) Selected camera for
each pixel in $c_0$ (a) Original (b) Reprojected (c) Kernel (d) Inpainted

REAL-TIME OMNIDIRECTIONAL STEREO MATCHING METHOD USING MULTI-VIEW FISHEYE LENSES AND SYSTEM THEREOF

RELATED APPLICATION(S)

This application is based on and claims priority under 35 U.S.C. 119 to Korean Patent Application No. 10-2021-0038583, filed on Mar. 25, 2021, and Korean Patent Application No. 10-2022-0018075, filed on Feb. 11, 2022, in the Korean Intellectual Property Office, the disclosures of which are incorporated herein by reference.

BACKGROUND

1. Field of the Invention

The following description of example embodiments relates to real-time omnidirectional stereo matching technology using multi-view fisheye lenses, and more particularly, to a real-time omnidirectional stereo matching method that may directly run on a multi-view fisheye image without an additional spherical rectification using multi-view fisheye lenses and a system thereof.

2. Description of the Related Art

Efficient and accurate understanding of an appearance and a structure of a three-dimensional (3D) scene is a vital capability of a computer vision used in many applications, such as an autonomous vehicle, robotics, augmented/mixed reality, and the like. A conventional stereo camera with a general lens has a narrow field of view, which is insufficient to capture scenes in all directions.

It is a natural choice to use a smaller number of fisheye lenses to reduce a number of cameras while covering all directions. However, in the case of using a plurality of fisheye lenses, epipolar geometry is not maintained. That is, fast scan-line stereo matching does not apply to a non-pinhole camera. Therefore, a configuration of an omnidirectional camera with a plurality of fisheye lenses suffers from an inevitable tradeoff between performance and accuracy when computing a 360-degree panorama and a distance due to the following optical characteristics of fisheye lenses.

Initially, a conventional pinhole camera model is invalid as a fisheye lens even after a lens correction. Also, it is necessary to use an equirectangular projection or a latitude-longitude projection as a digital representation for a fisheye image in stereo matching. It introduces a serious image distortion to such representation and accordingly, a warp-aware correspondence search with a spatial change is additionally required for accurate stereo matching, which may lead to significant computational cost. Also, without a 360-degree dense distance map, multi-view fisheye images may not be accurately merged as a 360-degree panorama image and a 360-degree dense distance map may not be acquired through filtering. The chicken-and-egg issue arises when combining multi-view fisheye images into a 360-degree RGB-D image with high accuracy.

SUMMARY

Example embodiments provide a real-time omnidirectional stereo matching method that may directly run on a multi-view fisheye image without an additional spherical rectification using multi-view fisheye lenses and a system thereof.

According to an aspect of an example embodiment, there is provided a real-time omnidirectional stereo matching system including a first pair of fisheye cameras including a first fisheye camera and a second fisheye camera provided to perform shooting in opposite directions; and a second pair of fisheye cameras including a third fisheye camera and a fourth fisheye camera provided to perform shooting in opposite directions. The first pair of fisheye cameras and the second pair of fisheye cameras are vertically provided with different heights and generate a distance map to project a fisheye image according to three-dimensional (3D) coordinates.

The first pair of fisheye cameras and the second pair of fisheye cameras may be arranged with different heights to generate a partial overlap of the first fisheye camera to the fourth fisheye camera.

The real-time omnidirectional stereo matching system may further include a receiver configured to receive fisheye images of a subject captured through the first fisheye camera to the fourth fisheye camera; a selector configured to select a single fisheye camera from among fisheye cameras for each pixel of a preset reference fisheye image among the received fisheye images using a sweep volume for preset distance candidates; a generator configured to generate a distance map for all pixels using the reference fisheye image and a fisheye image of the selected single fisheye camera; and a matcher configured to perform real-time stereo matching on the received fisheye images using the generated distance map.

The selector may be configured to select a fisheye camera with a highest distance discrimination power as the single fisheye camera for each pixel of the reference fisheye image.

The selector may be configured to select a fisheye camera having a largest angle change between a first distance candidate and a last distance candidate among the distance candidates as the single fisheye camera for each pixel of the reference fisheye image.

The generator may be configured to generate the distance map for all the pixels using a bilateral cost volume filtering on the reference fisheye image and the fisheye image of the selected fisheye camera.

The generator may be configured to generate a 360-degree color image in real time using the generated distance map and pixel values of the fisheye images.

The generator may be configured to generate a final 360-degree color image in real time by inpainting a missing region in the 360-degree color image using a background of the 360-degree color image.

The generator may be configured to determine an inpainting direction by determining a foreground direction and a background direction in the 360-degree color image, to compute an inpainting kernel based on the determined inpainting direction and an occlusion direction of the missing region, and to inpaint the missing region using a depth value of a background of the 360-degree color image by applying the computed inpainting kernel to the distance map.

According to an aspect of an example embodiment, there is provided a real-time omnidirectional stereo matching method in a camera system including a first pair of fisheye cameras including a first fisheye camera and a second fisheye camera provided to perform shooting in opposite directions and a second pair of fisheye cameras including a third fisheye camera and a fourth fisheye camera provided to perform shooting in opposite directions and in which the first pair of fisheye cameras and the second pair of fisheye cameras are vertically provided with different heights, the real-time omnidirectional stereo matching method including receiving fisheye images of a subject captured through the first fisheye camera to the fourth fisheye camera; selecting a single fisheye camera from among fisheye cameras for each pixel of a preset reference fisheye image among the received fisheye images using a sweep volume for preset distance candidates; generating a distance map for all pixels using the reference fisheye image and a fisheye image of the selected single fisheye camera; and performing real-time stereo matching on the received fisheye images using the generated distance map.

The selecting of the single fisheye camera may include selecting a fisheye camera with a highest distance discrimination power as the single fisheye camera for each pixel of the reference fisheye image.

The selecting of the single fisheye camera may include selecting a fisheye camera having a largest angle change between a first distance candidate and a last distance candidate among the distance candidates as the single fisheye camera for each pixel of the reference fisheye image.

The generating of the distance map for all the pixels may include generating the distance map for all the pixels using a bilateral cost volume filtering on the reference fisheye image and the fisheye image of the selected fisheye camera.

The real-time omnidirectional stereo matching method further include generating a 360-degree color image in real time using the generated distance map and pixel values of the fisheye images.

The generating of the 360-degree color image in real time may include generating a final 360-degree color image in real time by inpainting a missing region in the 360-degree color image using a background of the 360-degree color image.

The generating of the 360-degree color image in real time may include determining an inpainting direction by determining a foreground direction and a background direction in the 360-degree color image, computing an inpainting kernel based on the determined inpainting direction and an occlusion direction of the missing region, and inpainting the missing region using a depth value of a background of the 360-degree color image by applying the computed inpainting kernel to the distance map.

According to an aspect of an example embodiment, there is provided a real-time omnidirectional stereo matching method in a camera system including a first pair of fisheye cameras including a first fisheye camera and a second fisheye camera provided to perform shooting in opposite directions and a second pair of fisheye cameras including a third fisheye camera and a fourth fisheye camera provided to perform shooting in opposite directions, the real-time omnidirectional stereo matching method including receiving fisheye images of a subject captured through the first fisheye camera to the fourth fisheye camera; selecting a single fisheye camera from among fisheye cameras for each pixel of a preset reference fisheye image among the received fisheye images using a sweep volume for preset distance candidates; generating a distance map for all pixels using a bilateral cost volume filtering for the reference fisheye image and a fisheye image of the selected single fisheye camera; and performing real-time stereo matching on the received fisheye images using the generated distance map.

The selecting of the single fisheye camera may include selecting a fisheye camera with a highest distance discrimination power as the single fisheye camera for each pixel of the reference fisheye image.

The selecting of the single fisheye camera may include selecting a fisheye camera having a largest angle change between a first distance candidate and a last distance candidate among the distance candidates as the single fisheye camera for each pixel of the reference fisheye image.

According to some example embodiments, there may be provided an efficient real-time sphere-sweeping stereo technology that may directly run on a multi-view fisheye image without an additional spherical rectification using an equirectangular projection or a latitude-longitude projection.

According to some example embodiments, it is possible to implement a real-time omnidirectional 360-degree RGB-D camera and, through this, to apply to robotics and autonomous driving to which the real-time omnidirectional 360-degree RGB-D camera is applicable.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
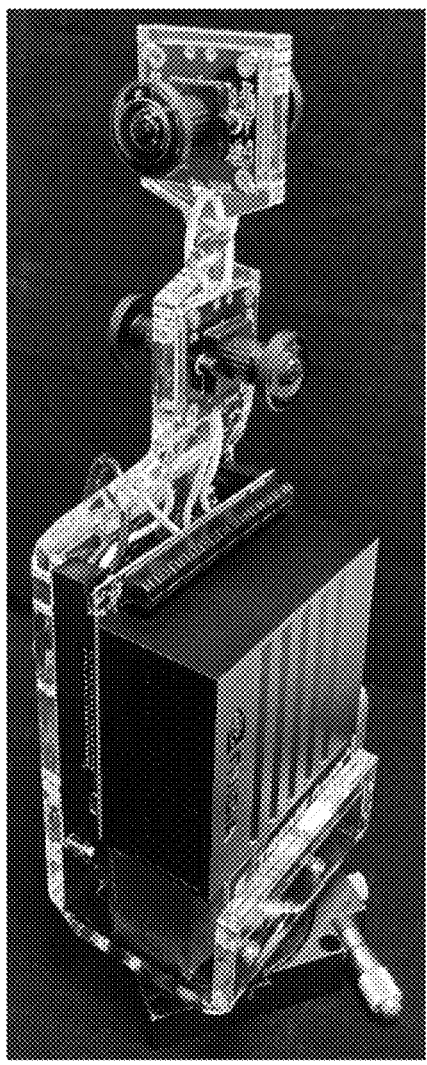
FIG. 1 illustrates an example of a real-time omnidirectional stereo matching system according to an example embodiment.
Figure 1:
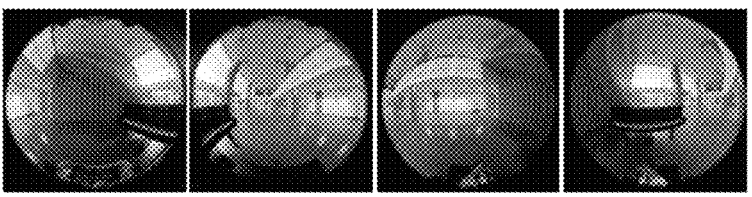
Figure 1:
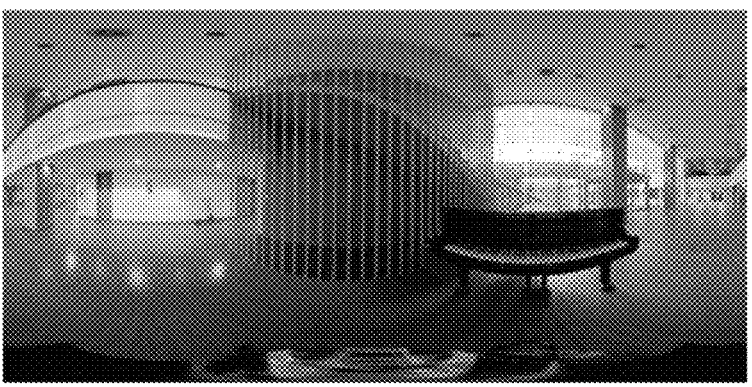
Figure 1:
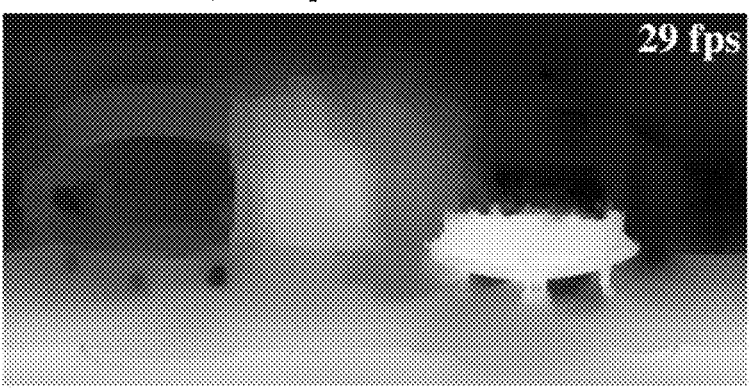

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terms used herein is for describing various example embodiments only, and is not construed to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described in detail with reference to the accompanying drawings. Like reference numerals refer to like components throughout, wherever possible, even though they are shown in different drawings. Further description related thereto is omitted.

A set of cameras with fisheyes lens have been used to capture a wide field of view. A traditional scan-line stereo algorithm based on epipolar geometry may be directly inapplicable to a non-pinhole camera setup due to optical characteristics of fisheye lenses. Therefore, an existing complete 360-degree RGB-D imaging system have rarely achieved real-time performance yet.

Example embodiments provide an efficient real-time sphere-sweeping stereo technology that may directly run on a multi-view fisheye image without an additional spherical rectification using an equirectangular projection or a latitude-longitude projection.

The main contributions of the example embodiments are as follows. Initially, introduced is an adaptive spherical matching method that may directly evaluate stereo matching in a fisheye image region in consideration of a regional discrimination power of a distance in each fisheye image. Also, provided is a fast inter-scale bilateral cost volume filtering method that refines a distance in a noisy and textureless region of a spherical region with optimal complexity of $O(n)$. In this manner, 360-degree dense distance estimation is enabled in real time in all directions, while preserving edge. Also, fisheye color and distance images are seamlessly combined into a complete 360-degree RGB-D image through fast inpainting of a dense distance map.

The present invention may be implemented using a plurality of fisheye cameras, for example, four fisheye cameras as illustrated in FIG. 1. The prototype of the present invention may capture a complete 360-degree RGB-D video that includes a color and a distance in all pixels with a resolution of 2 megapixels at 29 frames per second (FPS). Results demonstrate that a real-time algorithm of the present invention outperforms the traditional omnidirectional stereo and learning-based 360-degree stereo algorithm in terms of accuracy and performance.

Figure 2:
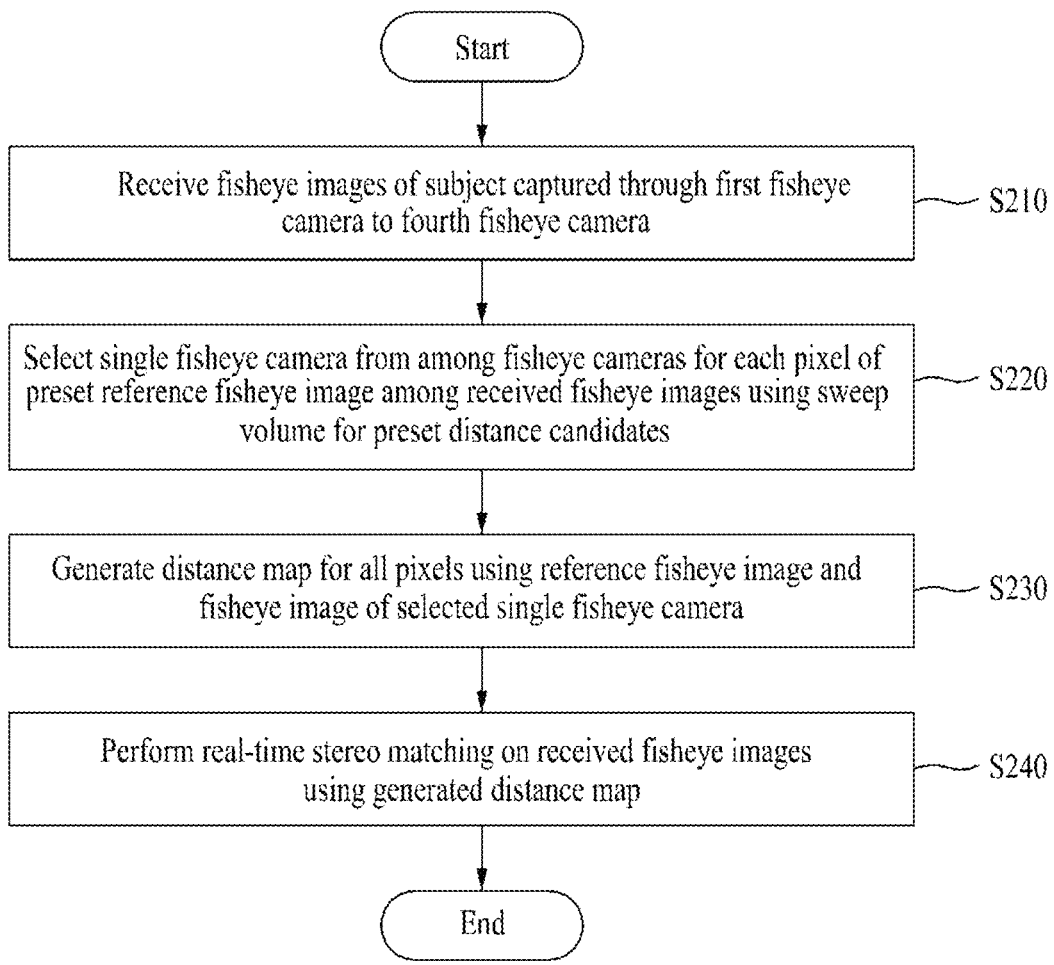
FIG. 2 is a flowchart illustrating a real-time omnidirectional stereo matching method according to an example embodiment.
Figure 3:
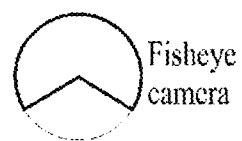
FIG. 3 illustrates an example of a projection in a sphere sweep volume according to an example embodiment.
Figure 3:
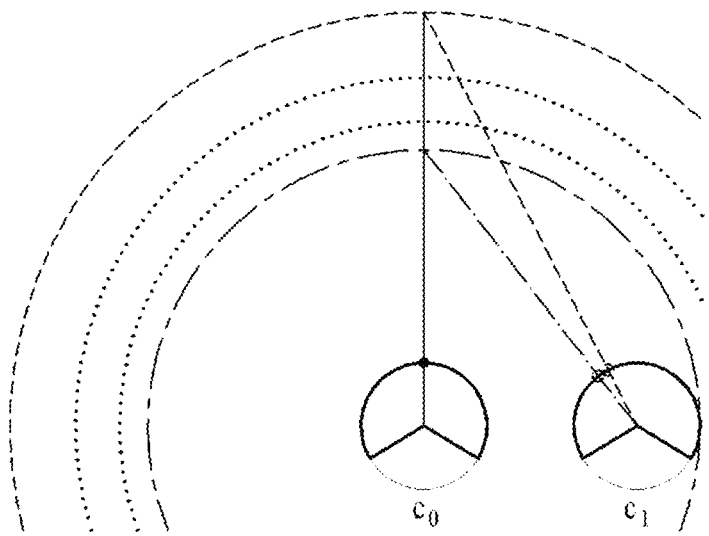

FIG. 2 is a flowchart illustrating a real-time omnidirectional stereo matching method according to an example embodiment, and illustrates the real-time omnidirectional stereo matching method performed in a camera system including a first fisheye camera and a second fisheye camera provided to perform shooting in opposite directions and a second pair of fisheye cameras including a third fisheye camera and a fourth fisheye camera provided to perform shooting in opposite directions and in which the first pair of fisheye cameras and the second pair of fisheye cameras are vertically provided with different heights and generate a distance map to project a fisheye image according to 3D coordinates.

Referring to FIG. 2, in operations S210 and S220, the real-time omnidirectional stereo matching method receives fisheye images of a subject captured through the first fisheye camera to the fourth fisheye camera and selects a single fisheye camera from among remaining fisheye cameras for each pixel of a preset reference fisheye image among the received fisheye images using a sweep volume for preset distance candidates.

Here, in operation S220, a fisheye camera with a highest distance discrimination power may be selected as the single fisheye camera for each pixel of the reference fisheye image.

Here, in operation S220, a fisheye camera having a largest angle change between a first distance candidate and a last distance candidate among the distance candidates may be selected as the single fisheye camera for each pixel of the reference fisheye image.

When the single fisheye camera is selected through operation S220, the real-time omnidirectional stereo matching method generates a distance map for all pixels using the reference fisheye image and a fisheye image of the selected single fisheye camera, and performs real-time stereo matching on the received fisheye images using the generated distance map in operations S230 and S240.

Here, in operation S230, the distance map for all the pixels may be generated using a bilateral cost volume filtering on the reference fisheye image and the fisheye image of the selected fisheye camera.

Further, the real-time omnidirectional stereo matching method according to an example embodiment may generate a 360-degree color image in real time using the generated distance map and pixel values of the fisheye images.

Here, in a process of generating the 360-degree color image in real time, a final 360-degree color image may be generated in real time by inpainting a missing region in the 360-degree color image using a background of the 360-degree color image. In detail, in the process of generating the 360-degree color image in real time, an inpainting direction may be determined by determining a foreground direction and a background direction in the 360-degree color image, an inpainting kernel may be computed based on the determined inpainting direction and an occlusion direction of the missing region, and the missing region may be inpainted using a depth value of a background of the 360-degree color image by applying the computed inpainting kernel to the distance map.

Hereinafter, the method of the present invention is described with reference to FIGS. 3 to 8.

Binocular fisheye/360-degree stereo: Two fisheye cameras or 360-degree cameras are provided on a baseline and used to estimate a depth within a stereo field of view, for example, a distance in omnidirectional stereo. Similar to the traditional epipolar geometry, they apply spherical rectification and block-by-block cost matching along a great circle. However, a disparity in spherical stereo is proportional to a length of arc, which is not linearly proportional to the inverse of distance. The epipolar geometry for a non-pinhole camera is not maintained even after lens calibration of fisheye lenses or 360-degree cameras. Therefore, there is a need for a correspondence search using an expensive sweeping volume inapplicable to a real-time distance estimate.

An equirectangular projection or a latitude-longitude projection has been used to rectify a fisheye image before computing a stereo matching. This process requires great memory cost and causes a serious image distortion in projection, and a geometric distortion interrupts an accurate correspondence search of spherical stereo.

Also, in this binocular setup, a distance may not be properly estimated along a baseline axis. That is, no complete 360-degree panorama and distance maps may be directly computed through this binocular stereo setup due to occlusion between cameras and, most importantly, due to absence of exploitable baseline in alignment. The method disclosed herein may use a plurality of cameras, for example, four cameras and may capture a 360-degree RGB-D image in real time.

Monocular 360-degree stereo: A traditional structure-from-motion algorithm has been applied to compact 360-degree imaging. However, this method assumes that a 360-degree camera moves in a static scene. When applying this method to a scene with dynamic objects, performance significantly degrades. Also, due to high computational cost, the method may not be applied to real-time 360-degree RGB-D imaging. Also, monocular stereo imaging has been applied to a 360-degree panorama by learning an omnidirectional image prior. The learned prior may assist matching correspondences in warped images. However, a real-time learning-based method does not exist yet due to model complexity. Also, to date, there is not real-world dataset of omnidirectional RGB-D images available for deep learning. Such a method is trained on synthetically rendered images of a hand-made 3D model and 3D scanning. Due to a domain gap between a real image and a rendered image, such a model may often present suboptimal performance with unseen real-world data.

Multi-view fisheye stereo: A plurality of fisheye cameras may be combined into a spherical light-source camera to capture a 360-degree RGB-D image. A number of cameras ranges from 4 to 20. As the number of cameras increases, quality of a color image and a distance image significantly improves, but with a rapid increase in hardware and computational cost. When combining multi-view fisheye stereo images, technical challenges still remain hindering real-time performance of the setup. Initially, a complete 360-degree guide image is required to consider reprojection, occlusion, and visibility of a distance value in the unified omnidirectional image space. Here, the 360-degree guide image may not be acquired from a multi-view input without a 360-degree dense distance map. Simple warp and blending methods are proposed without distance awareness. The proposed methods are designed for a short baseline and accordingly, often suffer from stitching artifacts when a disparity value varies in an overlapping region. Also, due to geometry of fisheye matching multiple true matches may occur, which may be handled by devising computationally intensity cost aggregation.

In contrast, the present invention may use a minimum number of fisheye cameras to cover complete 360-degree angles in real time, to maintain building cost and computational requirements as low as possible.

Fast Sphere Sweeping Stereo

Hardware design: Referring to FIG. 1, the present invention may employ four cameras with fisheye lenses to achieve a 360-degree RGB-D image. Each fisheye camera may have a field of view of 220 degrees or more. A single pair of front and rear fisheye cameras are provided on the top and another pair of fisheye cameras are provided on the bottom and provided in a perpendicular direction such that each combination of neighboring stereo pairs has the same baseline.

Spherical geometry: The present invention is based on a classical binocular stereo model. Each pixel in a reference frame $I_{c0}$ captured by a reference camera $c_0$ may represent color of a ray detected at an angle of polar coordinates ($\theta$, $\varphi$). It corresponds to a point of polar coordinates ($\theta$, $\varphi$, d). Here, d denotes a distance and may lead to a 3D position p in space of $c_0$, and the 3D position p may be represented as the following equation.

$$p = d[\sin(\theta)\cos(\phi), \sin(\theta)\sin(\phi), \cos(\phi)]^T$$

Here, it is assumed that another camera $c_1$ is provided at rotation $R_{c1}$ and position $T_{c1}$ with respect to the reference camera $c_0$. The camera captures images $I_{c0}$ and $I_{c1}$. The position p in the space of $c_1$ is $p_{c_1} = R_{c_1}^{-1}(p - T_{c_1})$. When $\hat{p}_{c_1} = p_{c_1}/\|p_{c_1}\|$ is a normalized vector of $p_{c_1}$, pixel coordinates in $I_{c1}$ may be represented as the following equation.

$$(\theta_{c_1}, \phi_{c_1}) = \left(\arccos(\hat{p}_{c_1\,z}), \frac{3\pi}{2} - \arctan2(\hat{p}_{c_1\,y}, \hat{p}_{c_1\,x})\right)$$

Pixel coordinates in $c_1$ with camera transformation $R_{c1}|T_{c1}$ may be expressed as pixel projection of an angle ($\theta$, $\varphi$) at the distance d in a reference coordinate system and may be represented as the following equation.

$$(\theta_{c_1}, \phi_{c_1}) = \mathcal{P}_{R_{c_1}|T_{c_1}}(\theta, \phi, d)$$

Assuming Lambertian surface in a scene, a pixel $I_{c1}(\theta_{c1}, \varphi_{c1})$ is identical to a pixel $I_{c0}(\theta, \varphi)$ of a reference camera. Pixels in images of other cameras may be expressed with respect to a reference coordinate system in the same manner.

Sphere sweep volume: Similar to a multi-view stereo having a standard camera model, the present invention builds a sweep volume for a plurality of distance candidates $d_0, \ldots, d_{N-1}$. Instead of warping from $I_{c1}$ to $I_{c0}$ following homographies with planar distance candidates, the present invention may use the aforementioned mapping and spherical distance candidates around a reference frame or a given point.

For each candidate, a warped version of $I_{c1}$ that may be matched to $I_{c0}$ is generated if a distance candidate is correct. In detail, referring to FIG. 3, the present invention finds corresponding coordinates for all pixel coordinates ($\theta$, $\phi$) in I and for all distance candidate $d_i$. Then, a value of a sphere sweep volume V is assigned, as follows:

$$V_{c_1 \to c_0}(\theta, \phi, i) = I_{c_1}\left(\mathcal{P}_{R_{c_1}|T_{c_1}}(\theta, \phi, d_i)\right).$$

In this volume, a correct distance candidate $d_k$ shows good matching:

$V_{c_1 \to c_0}(\theta, \phi, k) \approx I_{c_0}(\theta, \phi)$, which provides a direct cue for distance estimation. The quality of matching may be evaluated through photometric difference or difference after image transformation, such as a gradient, census transformation, a feature transformation, and the like. For robust performance, cost aggregation or deep normalization is required when selecting an optical, that is, best depth candidate. A plurality of views may be simultaneously used.

Adaptive Spherical Matching

The present invention may evaluate the entire depth candidates in all possible combinations of all possible overlapping regions along a baseline in a sphere sweep volume, which may be exhaustive computation. To achieve real-time performance, the present invention may employ a camera selection method that provides a regional best camera pair for a search correspondence in the sphere sweep volume with reference to a reference camera.

The present invention may select only a best camera from among three cameras ($c_1$, $c_2$, and $c_3$) for each pixel in a reference view. When a plurality of cameras has a field of view capable of covering a pixel in a reference frame, a camera having a highest distance discrimination power may be selected. This property may be described as maximizing a difference between layers of the sphere sweep volume and be able to more clearly identify a best matching candidate.

To quantify this for a given pixel position $(\theta, \varphi)$ in a reference image $I_{c0}$, the present invention may focus on a first layer and a last layer, that is, 0 and N−1 of a volume corresponding to distance candidates $d_0$ and $d_{N-1}$. When $p_{ck}^{<0>}$ is a point in the space of camera $c_k$ of reference coordinates $(\theta, \phi, d_i)$, the best camera $c_k$ may be the one that shows a largest angular change between two 3D points $p_{ck}^{<0>}$ and $p_{ck}^{<N-1>}$ given from two distance candidates.

In detail, when an angle between $p_{ck}^{<0>}$ and $p_{ck}^{<N-1>}$ is high, a sampled position in a selected camera for the sweeping volume will significantly change, which is suitable for distance estimation. The present invention may define a discrimination power weight based on such considerations and the discrimination power weight may be represented as the following equation.

$$q_{c_k} = \left|\arccos\left\langle \hat{p}_{c_k}^{<0>} \cdot \hat{p}_{c_k}^{<N-1>} \right\rangle\right|$$

Here, $\hat{p}=p/\|p\|$ denotes a normalized vector.

Using this evaluation, an optimal camera c* for each pixel may be selected as in the following Equation 1

Equation 1

$$c^*(\theta, \phi) = \underset{c_k}{\operatorname{argmax}}\left(q_{c_k}\right) \quad \text{[Equation 1]}$$

Figure 4A:
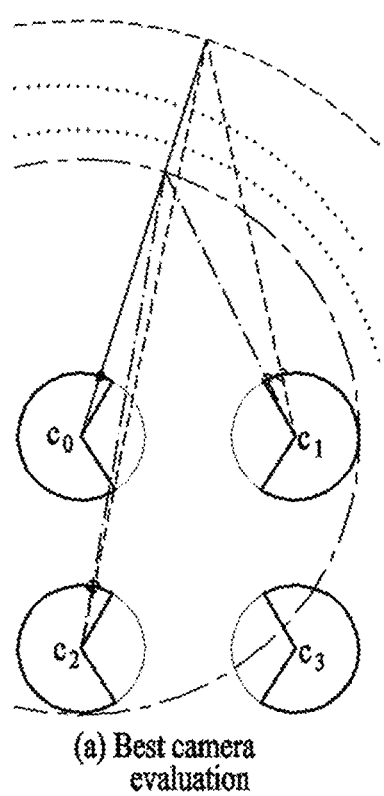
FIGS. 4A and 4B illustrate examples of selecting a camera based on a given ray angle in a reference frame and a map in which a camera is selected based on a pixel position according to an example embodiment.
Figure 4B:
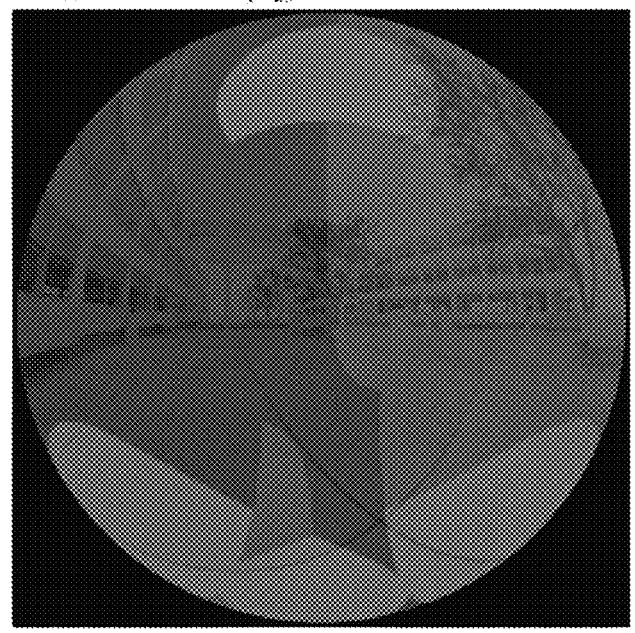

FIGS. 4A and 4B illustrate examples of selecting a camera based on a given ray angle in a reference frame and a map in which a camera is selected based on a pixel position according to an example embodiment. FIG. 4A illustrates an example of evaluating how a ray of $c_0$ is reprojected in $c_1$ and $c_2$, and FIG. 4B illustrates an example of selecting a camera showing a best distance discrimination for each pixel in $c_0$.

Referring to FIGS. 4A and 4B, a camera most suitable for matching with respect to a corresponding pixel may be the one that shows a maximum displacement for a given distance. When a small distance change leads to a high displacement, a distance discrimination power is improved. Referring to FIG. 4A, it can be seen that, for a specific ray in $c_0$, $c_1$ is a better camera for matching than $c_2$ although a baseline between two pairs is similar.

Efficient Spherical Cost Aggregation

The present invention may calibrate four cameras using a double spherical model and may perform two 220-degree distance estimations using two opposed top cameras as two references. For each pixel in each reference, a best camera may be selected using selective matching. When $I_{cs}$ is an image from a camera selected at a pixel $(\theta, \phi)$ and $I_{c0}$ is a reference frame, matching cost for an $i^{th}$ distance candidate may be represented as the following equation.

$$C(\theta, \phi, i) = \left\| V_{c_s \to c_0}(\theta, \phi, i) - I(\theta, \phi) \right\|_1$$

Here, $V_{c_s \to c_0}$ denotes a sphere sweep volume from the selected camera to the reference camera. The present invention may regularize each slice of the spherical cost volume using a fast filtering method.

Fast Inter-Scale Bilateral Filtering

For aggregating sparse distances to acquire a dense distance map, there are many available methods that smoothen cost in an edge-aware manner. A bilateral grid-based method, while showing an impressive capability, is still computationally expensive to apply to a 3D cost volume and often produces blocky artifacts even with domain transform post processing. A more hardware-friendly version of a fast bilateral solver is devised and, while demonstrating strong performance for a single depth map, is more hardware specific and is still computationally inefficient to apply to a complete cost volume in real time. Another popular edge-aware filtering is a guide filter used with a cost volume pyramid or a multi-scale cost aggregation. While showing optimal complexity of O(n), fast performance on a GPU may not be performed due to computing overhead when computing integral images in parallel environments. To achieve 2-megapixel real-time RGB-D imaging at 29 fps on an embedded machine with a GPU, the present invention may introduce a fast inter-scale bilateral filtering method specially designed for parallel computing environments.

Edge-preserving downsampling: A first stage of filtering according to the present invention is to prevent edge bleeding and halos by downscaling an input image without blurring. To this end, the present invention filters neighbor pixels using bilateral weights before decimation. When $I_0$ is defined as an original image and $I_1$ is defined as an image after being downsampled by two 1 times, the bilateral weights may be represented as the following Equation 2.

$$w_{mn}^l(I, x, y) = \exp\left(\frac{\|I(x, y) - I(x+m, y+n)\|^2}{2\sigma_I^2}\right) \quad \text{[Equation 2]}$$

In Equation 2, or denotes an edge preservation parameter and (x, y) denotes pixel coordinates. Here, a downsampling scheme may be defined as the following Equation 3.

$$I^l(x, y) = \sum_{m,n=-1}^{1} I(2x+m, 2y+n)w_{mn}^l(I, 2x, 2y)/\tau \quad \text{[Equation 3]}$$

In Equation 3, τ denotes a normalizing constant. $I_{l+1}=I_l^\downarrow$ may be noted in the pyramid and a number of scale levels L may be defined.

Edge-preserving upsampling: Dissimilar to an existing edge preservation upsampling method using a high-resolution image as a guide, the method of the present invention may achieve an optimal complexity using bilateral weights between a downsampled image and a full-resolution image. Here, the present invention may intentionally not use a Gaussian spatial weight to focus on efficiency and may use a partial constant output.

In addition to bilateral weights, the present invention blends scales using a Gaussian function of a current scale index, which may be defined for each scale as $$w_l^\uparrow = \exp\left(\frac{(2^l)^2}{2\sigma_s^2}\right).$$

Here, $\sigma_s$ denotes a smoothness parameter. A weight of a higher resolution scale may be naturally $1-\omega_l^\uparrow$.

Figure 5:
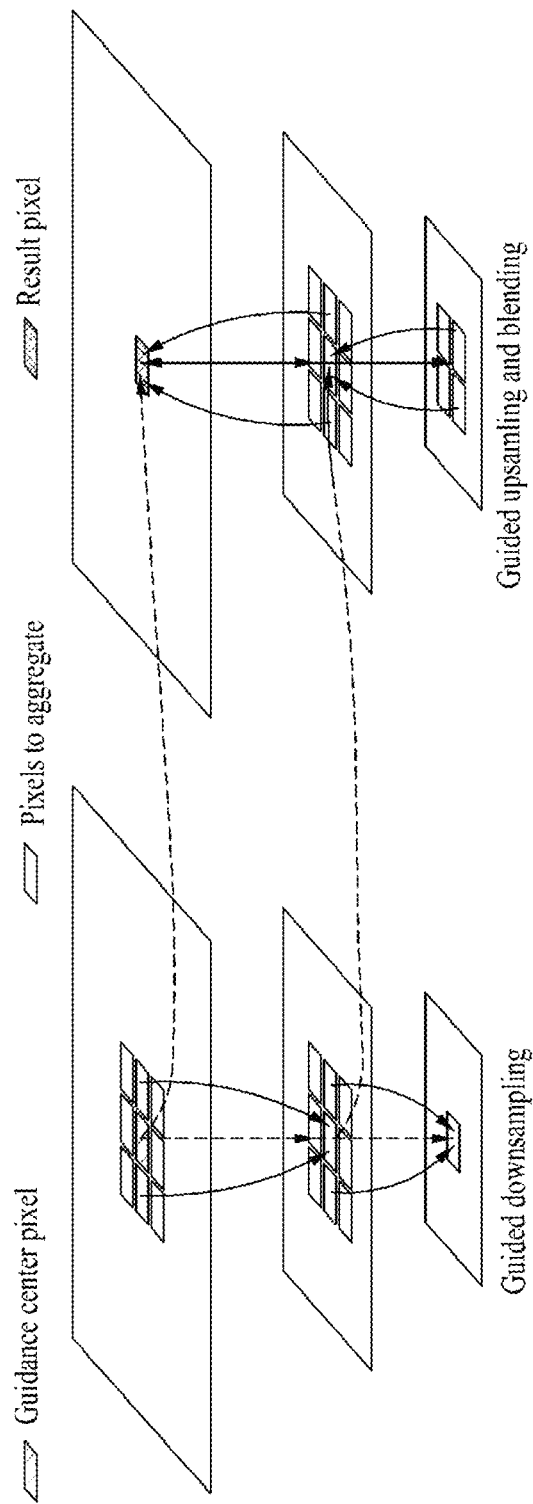
FIG. 5 illustrates an example of a bilateral filtering between scales as an example for a multi-scale filtering process according to an example embodiment.

FIG. 5 illustrates an example of a bilateral filtering between scales as an example for a multi-scale filtering process according to an example embodiment.

Referring to FIG. 5, the multi-scale filtering process performs downsampling with edge preservation using bilateral weights between a guidance center pixel and a neighbor pixel and then aggregates sparse cost and then performs upsampling using a minimal pixel support. The present invention may use guidance weights computed between the guidance center and the pixel to aggregate at lower scale.

After performing cost volume filtering, an optimal distance may be determined through a winner-takes-all-method and a sub-candidate accuracy may be achieved through quadratic fitting.

Figure 6:
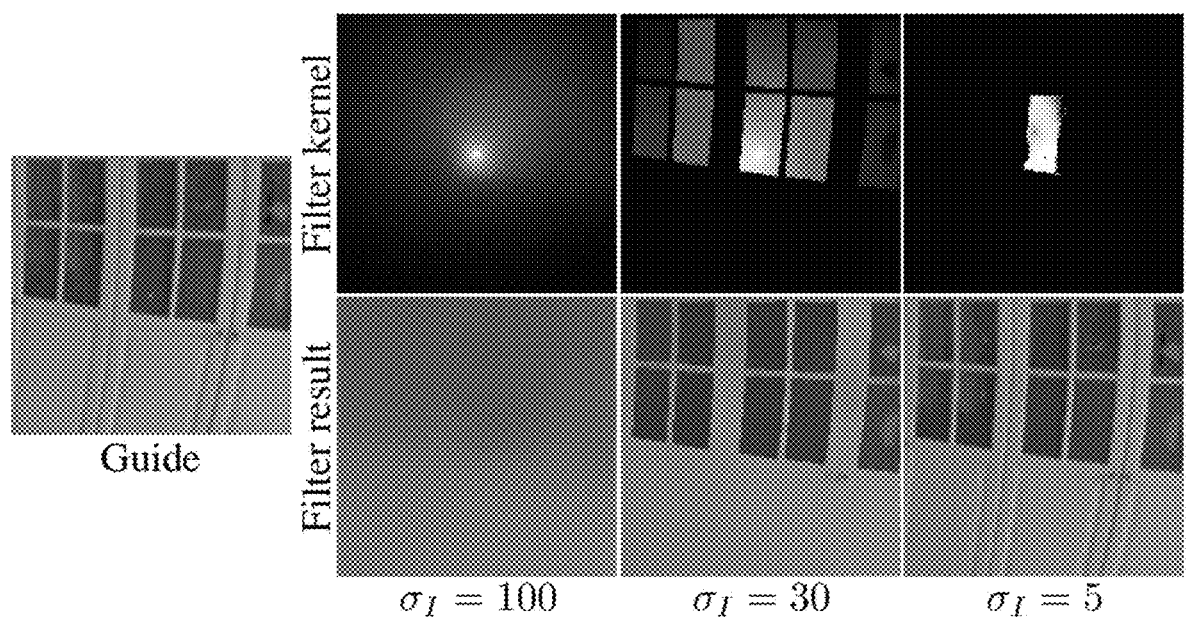
FIG. 6 illustrates an example of a filter kernel of an edge preservation parameter according to an example embodiment.

Filter kernel: A final filter kernel acquired after the downsampling/upsampling process yields a smooth reduction driven by $\sigma_s$ when moving away from the center, and does not cross an edge boundary as shown in FIG. 6. Although each stage of the algorithm only covers a minimal pixel support, a bilateral downsampling/upsampling filtering yields a kernel that covers the entire image. The guidance through bilateral weights refers to an exponential composition with higher order far from a given pixel. This improves the guidance between spaced pixels. Herein, $\sigma_s$ may be set to 25 and $\sigma_1$ may be set to 10.

Complexity: A number of operations follows a sum of geometric series with a radio of 1/4. Therefore, asymptotic complexity is O(n) with n pixels, making the algorithm optimal. The number of levels needs to allow a lowest level L to have a size above one pixel. The present invention performs downsampling at most $\ln_4(n)$ times. Although downsampling and upsampling need to be sequentially performed with O(ln(n)) levels, each downsampling and upsampling stage needs to be fully parallelized.

Distance-Aware Panorama Stitching

Figure 7:
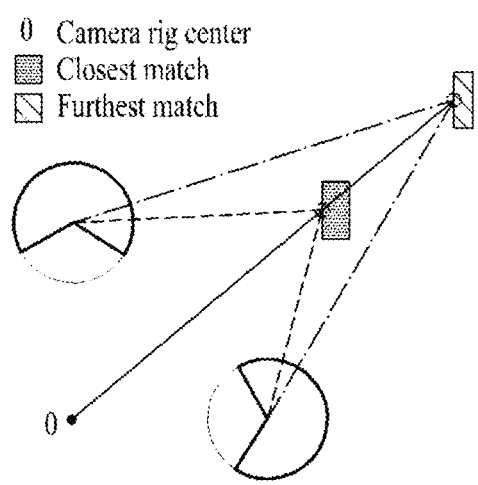
FIG. 7 illustrates an example of a distance estimation algorithm according to an example embodiment.

A distance estimation algorithm herein may use a reference frame for edge preservation and avoid a plurality of true matches as illustrated in FIG. 7. Although this approach improves an accuracy, an additional stage is required to merge fisheye images. The present invention presents an efficient method of assigning a greater weight to a least displaced pixel by initially synthesizing a distance map at a desired position, projecting an image according to 3D coordinates, and then merging images through a blending process.

New view synthesis: A first stage is to reproject a dense distance map to a selected position, common to both references. To this end, a position corresponding to each pixel (θ, φ) is found, translating the same to a selected position is performed, and coordinates $(\theta_r, \varphi_r)$ are found in the reprojected image. Here, the coordinates $(\theta_r, \varphi_r)$ in the reprojected image may be acquired through the following equation.

$$(\theta_r, \varphi_r) = \overline{P}_{T^*}(\theta, \phi, \hat{D}(\theta, \phi))$$

Here, T* denotes the desired position with respect to a camera and $\hat{D}$ denotes an estimated distance map. A forward warping operation inevitably leads to a plurality of pixels in an original distance map mapping to the same target pixel. That is, a plurality of couples (θ, φ) may be projected to the same coordinates $(\theta_r, \varphi_r)$. This ambiguity requires splatting to acquire a final value.

The present invention may merge possible pixels in an occlusion-aware manner. In particular, a minimum distance splatting, that is, z-buffering may be used and a reprojected distance may be computed as in the following Equation 4.

$$\hat{D}_r(\theta_r, \varphi_r) = \min \hat{D}(\theta, \phi),$$

$$\text{s.t. } \overline{P}_{T^*}(\theta, \phi, \hat{D}(\theta, \phi)) = (\theta_r, \varphi_r) \quad \text{[Equation 4]}$$

Directional inpainting: While some pixels in a target may have a plurality of counterparts in the original distance map, some pixels may have none due to occlusion. A missing region may be occluded by a foreground object and thus, may be inpainted using a background. To this end, a background-to-foreground direction may be determined, which may be given by a derivative of projection with respect to a distance. In practice, occlusion holes in a projected map are caused by regions with different distances not being reprojected at the same position. Therefore, an inpainting direction may be defined as in the following equation.

$$v_{T^*}(\theta, \phi) = \frac{\partial R_{T^*}(\theta, \phi, d)}{\partial d}$$

The inpainting direction leads to a directed diffusion kernel that may be iteratively used. The present invention determines a kernel weight around each pixel based on a similarity with the inpainting direction. The kernel weight around each pixel may be represented as in the following equation.

$$\omega_{m,n} = \langle v_{T^*}(\theta, \phi) \cdot (m, n) \rangle^+$$

Figure 8:
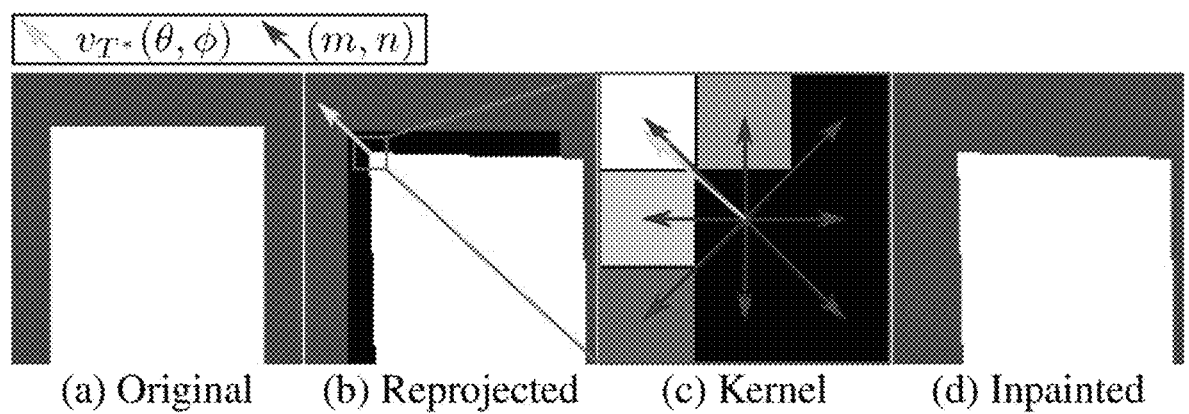
FIG. 8 illustrates an example of an inpainting process according to an example embodiment.

Here, + denotes a positive portion and $(m, n) \in [-1, 1]^2 \backslash (0, 0)$ denotes indices of eight neighbor pixels. Since a dot product assigns high weights to aligned vectors, the method naturally generates a diffusion kernel using values of pixels aligned in the inpainting direction as illustrated in FIG. 8. That is, a depth at a camera position as in (a) of FIG. 8 is projected to a desired view in a depth-aware manner as in (b) of FIG. 8. Since an occlusion generates holes in the projected distance map, an inpainting kernel is computed as in (c) of FIG. 8 according to an occlusion direction. By applying the computed inpainting kernel to the distance map, the holes may be removed using background depth values as in (d) of FIG. 8.

Once a distance is moved to a given point of view, an RGB image is provided at a different position by projecting a color pixel following 3D coordinates given in the distance map.

Blending: After projecting color images to a common position, two 220-degree images need to be merged to generate a complete panorama stored in a standard equirectangular projection. To this end, the present invention provides a blending weight corresponding to a possible occlusion amount. At a pixel in which $v_{T^*}(\theta, \phi)$ is large, a distance change may greatly modify an image and an occluded portion may cause a wider occlusion region, a more distance-related distortion, and potential artifacts accordingly. Therefore, a blending weight that follows Gaussian may be defined on a length of the vector, which may be expressed as in the following equation.

$$b_{c_k}(\theta, \phi) = \exp\left(-\frac{\|v_{T^*}(\theta, \phi)\|_2^2}{2\sigma^2}\right)$$

A pixel cannot be captured with the camera may be processed by setting $b_{ck}(\theta, \phi)=0$ and derivative may be estimated through a finite difference over the distance range.

As described above, the method according to example embodiments may provide an efficient real-time sphere-sweeping stereo technology that may directly run on a multi-view fisheye image without an additional spherical rectification using an equirectangular projection or a latitude-longitude projection.

Figure 9:
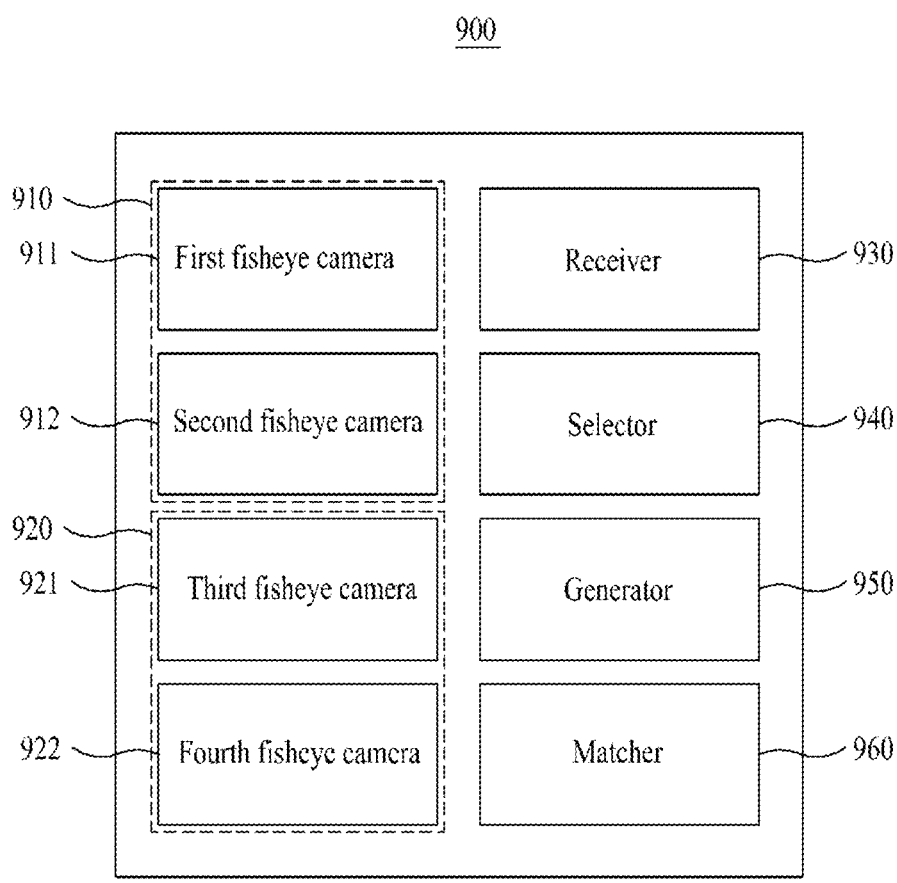
FIG. 9 is a diagram illustrating a configuration of a real-time omnidirectional stereo matching system according to an example embodiment.

FIG. 9 is a diagram illustrating a configuration of a real-time omnidirectional stereo matching system according to an example embodiment, that is, illustrates a conceptual configuration of a system for performing the method of FIGS. 1 to 8.

Referring to FIG. 9, a real-time omnidirectional stereo matching system 900 according to an example embodiment includes a first pair of fisheye cameras 910, a second pair of fisheye cameras 920, a receiver 930, a selector 940, a generator 950, and a matcher 960.

The first pair of fisheye cameras 910 include a first fisheye camera 911 and a second fisheye camera 912 provided to perform shooting in opposite directions.

The second pair of fisheye cameras 920 include a third fisheye camera 921 and a fourth fisheye camera 922 provided to perform shooting in opposite directions.

Here, the first pair of fisheye cameras 910 and the second pair of fisheye cameras 920 may be vertically provided with different heights and may generate a distance map and may project a fisheye image according to 3D coordinates.

The receiver 930 receives fisheye images of a subject captured through the first fisheye camera 911 to the fourth fisheye camera 922.

The selector 940 selects a single fisheye camera from among remaining fisheye cameras for each pixel of a preset reference fisheye image among the received fisheye images using a sweep volume for preset distance candidates.

Here, the selector 940 may select a fisheye camera with a highest distance discrimination power as the single fisheye camera for each pixel of the reference fisheye image.

Here, the selector 940 may select a fisheye camera having a largest angle change between a first distance candidate and a last distance candidate among the distance candidates as the single fisheye camera for each pixel of the reference fisheye image.

The generator 950 generates a distance map for all pixels using the reference fisheye image and a fisheye image of the selected single fisheye camera.

Here, the generator 950 may generate the distance map for all the pixels using a bilateral cost volume filtering on the reference fisheye image and the fisheye image of the selected fisheye camera.

Further, the generator 950 may generate a 360-degree color image in real time using the generated distance map and pixel values of the fisheye images.

Here, the generator 950 may generate a final 360-degree color image in real time by inpainting a missing region in the 360-degree color image using a background of the 360-degree color image. For example, in a process of generating the 360-degree color image, the generator 950 may determine an inpainting direction by determining a foreground direction and a background direction in the 360-degree color image, may compute an inpainting kernel based on the determined inpainting direction and an occlusion direction of the missing region, and may inpaint the missing region using a depth value of a background of the 360-degree color image by applying the computed inpainting kernel to the distance map.

The matcher 960 performs real-time stereo matching on the received fisheye images using the generated distance map.

Although corresponding description is omitted in the system of FIG. 9, it will be apparent to those skilled in the art that description made above related to the method of FIGS. 1 to 8 may apply to the system of FIG. 9.

The apparatuses described herein may be implemented using hardware components, software components, and/or a combination of hardware components and software components. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. Program instructions stored in the media may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An omnidirectional stereo matching system comprising:
    a first pair of fisheye cameras comprising a first fisheye camera and a second fisheye camera provided to perform shooting in opposite directions;
    a second pair of fisheye cameras comprising a third fisheye camera and a fourth fisheye camera provided to perform shooting in opposite directions, wherein the first pair of fisheye cameras and the second pair of fisheye cameras are vertically provided with different heights;
    a receiver configured to receive fisheye images of a subject captured through the first fisheye camera to the fourth fisheye camera;
    a selector configured to select a single fisheye camera from among fisheye cameras for each pixel of a preset reference fisheye image among the received fisheye images using a sweep volume for preset distance candidates; and
    a generator configured to generate a distance map for all pixels using the reference fisheye image and a fisheye image of the selected single fisheye camera, the distance map configured to project a fisheye image according to three-dimensional (3D) coordinates.

2. The omnidirectional stereo matching system of claim 1, wherein the first pair of fisheye cameras and the second pair of fisheye cameras are arranged with different heights to generate a partial overlap of the first fisheye camera to the fourth fisheye camera.

3. The omnidirectional stereo matching system of claim 1, further comprising:
    a matcher configured to perform real-time stereo matching on the received fisheye images using the generated distance map.

4. The omnidirectional stereo matching system of claim 3, wherein the selector is configured to select a fisheye camera with a highest distance discrimination power as the single fisheye camera for each pixel of the reference fisheye image.

5. The omnidirectional stereo matching system of claim 3, wherein the selector is configured to select a fisheye camera having a largest angle change between a first distance candidate and a last distance candidate among the distance candidates as the single fisheye camera for each pixel of the reference fisheye image.

6. The omnidirectional stereo matching system of claim 3, wherein the generator is configured to generate the distance map for all the pixels using a bilateral cost volume filtering on the reference fisheye image and the fisheye image of the selected fisheye camera.

7. The omnidirectional stereo matching system of claim 3, wherein the generator is configured to generate a 360-degree color image in real time using the generated distance map and pixel values of the fisheye images.

8. The omnidirectional stereo matching system of claim 7, wherein the generator is configured to generate a final 360-degree color image in real time by inpainting a missing region in the 360-degree color image using a background of the 360-degree color image.

9. The omnidirectional stereo matching system of claim 8, wherein the generator is configured to determine an inpainting direction by determining a foreground direction and a background direction in the 360-degree color image, to compute an inpainting kernel based on the determined inpainting direction and an occlusion direction of the missing region, and to inpaint the missing region using a depth value of a background of the 360-degree color image by applying the computed inpainting kernel to the distance map.

10. A real-time omnidirectional stereo matching method in a camera system comprising a first pair of fisheye cameras comprising a first fisheye camera and a second fisheye camera provided to perform shooting in opposite directions and a second pair of fisheye cameras comprising a third fisheye camera and a fourth fisheye camera provided to perform shooting in opposite directions and in which the first pair of fisheye cameras and the second pair of fisheye cameras are vertically provided with different heights, the real-time omnidirectional stereo matching method comprising:
    receiving fisheye images of a subject captured through the first fisheye camera to the fourth fisheye camera;
    selecting a single fisheye camera from among fisheye cameras for each pixel of a preset reference fisheye image among the received fisheye images using a sweep volume for preset distance candidates;
    generating a distance map for all pixels using the reference fisheye image and a fisheye image of the selected single fisheye camera; and
    performing real-time stereo matching on the received fisheye images using the generated distance map.

11. The real-time omnidirectional stereo matching method of claim 10, wherein the selecting of the single fisheye camera comprises selecting a fisheye camera with a highest distance discrimination power as the single fisheye camera for each pixel of the reference fisheye image.

12. The real-time omnidirectional stereo matching method of claim 10, wherein the selecting of the single fisheye camera comprises selecting a fisheye camera having a largest angle change between a first distance candidate and a last distance candidate among the distance candidates as the single fisheye camera for each pixel of the reference fisheye image.

13. The real-time omnidirectional stereo matching method of claim 10, wherein the generating of the distance map for all the pixels comprises generating the distance map for all the pixels using a bilateral cost volume filtering on the reference fisheye image and the fisheye image of the selected fisheye camera.

14. The real-time omnidirectional stereo matching method of claim 10, further comprising:

generating a 360-degree color image in real time using the generated distance map and pixel values of the fisheye images.

15. The real-time omnidirectional stereo matching method of claim 14, wherein the generating of the 360-degree color image in real time comprises generating a final 360-degree color image in real time by inpainting a missing region in the 360-degree color image using a background of the 360-degree color image.

16. The real-time omnidirectional stereo matching method of claim 15, wherein the generating of the 360-degree color image in real time comprises determining an inpainting direction by determining a foreground direction and a background direction in the 360-degree color image, computing an inpainting kernel based on the determined inpainting direction and an occlusion direction of the missing region, and inpainting the missing region using a depth value of a background of the 360-degree color image by applying the computed inpainting kernel to the distance map.

17. A real-time omnidirectional stereo matching method in a camera system comprising a first pair of fisheye cameras comprising a first fisheye camera and a second fisheye camera provided to perform shooting in opposite directions and a second pair of fisheye cameras comprising a third fisheye camera and a fourth fisheye camera provided to perform shooting in opposite directions, the real-time omnidirectional stereo matching method comprising:

receiving fisheye images of a subject captured through the first fisheye camera to the fourth fisheye camera;

selecting a single fisheye camera from among fisheye cameras for each pixel of a preset reference fisheye image among the received fisheye images using a sweep volume for preset distance candidates;

generating a distance map for all pixels using a bilateral cost volume filtering for the reference fisheye image and a fisheye image of the selected single fisheye camera; and performing real-time stereo matching on the received fisheye images using the generated distance map.

18. The real-time omnidirectional stereo matching method of claim 17, wherein the selecting of the single fisheye camera comprises selecting a fisheye camera with a highest distance discrimination power as the single fisheye camera for each pixel of the reference fisheye image.

19. The real-time omnidirectional stereo matching method of claim 17, wherein the selecting of the single fisheye camera comprises selecting a fisheye camera having a largest angle change between a first distance candidate and a last distance candidate among the distance candidates as the single fisheye camera for each pixel of the reference fisheye image.

* * * * *